(12) United States Patent
Ghosh et al.

(10) Patent No.: US 12,519,777 B2
(45) Date of Patent: Jan. 6, 2026

(54) SYSTEMS AND METHODS FOR SIMULTANEOUS MULTIFACTOR AUTHENTICATION

(71) Applicant: Wells Fargo Bank, N.A., San Francisco, CA (US)

(72) Inventors: Debashis Ghosh, Charlotte, NC (US); Ashutosh Verma, Bengaluru (IN); Justin Blackburn, Litchfield Park, AZ (US); Rameshchandra Bhaskar Ketharaju, Hyderabad (IN); Naveen Gururaja Yeri, Bangalore (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 316 days.

(21) Appl. No.: 18/311,149

(22) Filed: May 2, 2023

(65) Prior Publication Data

US 2024/0372852 A1 Nov. 7, 2024

(51) Int. Cl.
*H04L 9/40* (2022.01)

(52) U.S. Cl.
CPC ........ *H04L 63/083* (2013.01); *H04L 63/1433* (2013.01)

(58) Field of Classification Search
CPC .......................... H04L 63/083; H04L 63/1433
See application file for complete search history.

(56) References Cited

U.S. PATENT DOCUMENTS

| | | | | |
|---|---|---|---|---|
| 8,990,912 B2* | 3/2015 | Baentsch | ............ | H04L 63/0853 726/9 |
| 10,742,647 B2* | 8/2020 | Crabtree | ................. | H04L 43/04 |
| 2014/0020058 A1* | 1/2014 | White | ..................... | G06F 21/32 726/2 |
| 2015/0254444 A1* | 9/2015 | Herger | ................... | G06V 40/28 726/19 |
| 2016/0087957 A1* | 3/2016 | Shah | ..................... | H04L 63/205 726/1 |

FOREIGN PATENT DOCUMENTS

EP 3286945 B1 11/2021

* cited by examiner

*Primary Examiner* — William S Powers
(74) *Attorney, Agent, or Firm* — K&L Gates LLP

(57) ABSTRACT

Systems, apparatuses, methods, and computer program products are disclosed for simultaneous multifactor authentication. An example method includes simultaneously receiving, by communications hardware and in response to a first authentication request, a plurality of authentication factors associated with an individual via a plurality of channels. The example method further includes performing, by an authentication engine, a verification operation that evaluates the plurality of authentication factors in parallel. The example method further includes authorizing, by the authentication engine, the one or more actions based on a successful outcome of the verification operation.

20 Claims, 5 Drawing Sheets

SYSTEMS AND METHODS FOR SIMULTANEOUS MULTIFACTOR AUTHENTICATION

BACKGROUND

Multifactor authentication requires more than one distinct authentication factor for successful authentication. However, implementations of multifactor authentication exhibit various issues and shortcomings.

BRIEF SUMMARY

Authentication is a useful tool for protecting resources (e.g., digital resources such as sensitive data). However, single-factor authentication (SFA) techniques such as a Personal Identification Number (PIN), a password to a username, and the like may be easily obtainable through nefarious means (e.g., phishing, malware, etc.). In this regard, multifactor authentication is typically preferred due to its additional layers of security.

Multifactor authentication utilizes two or more authentication factors. In some examples, authentication factors may include biometric markers, a PIN, a username and password, a one-time password, location data, and/or the like. While multifactor authentication does enhance system security, current implementations of multifactor authentication sequentially verify the different authentication factors. As one example, an individual may login to an online banking platform by inputting a username and password, and then subsequently, at a later time, input a one-time password (OTP) provided to them via a separate channel (e.g., an email) in order to fully gain access to the online banking platform. This sequential verification of multiple authentication factors leads to prolonged authentication times, which in turn introduces an increased potential for fraud (e.g., a bad actor may obtain the multiple authentication factors in the time available between factor verification).

Example embodiments alleviate the issues discussed above by simultaneously receiving and verifying multiple authentication factors in parallel. To do so, some example embodiments may leverage capabilities of advanced cellular networks (e.g., sixth generation (6G) cellular networks), as further discussed herein. Example embodiments may simultaneously receive, in response to an authentication request (e.g., a request to perform one or more actions that require authentication), a plurality of authentication factors associated with an individual via a plurality of channels. In some embodiments, the plurality of authentication factors may be of different authentication factor categories (e.g., knowledge factors, possession factors, inherence factors, location factors, or behavior factors). Alternatively, the received plurality of authentication factors may be the same factor of authentication transmitted from multiple computing devices.

Example embodiments may also verify at least a subset of the plurality of authentication factors in parallel. A security scoring model may be applied to the authentication factors that produces a security score indicative of the authenticity of the authentication factors. In some embodiments, the security scoring model may be applied to each authentication factor included in the plurality of authentication factors in parallel to produce a per-authentication factor security score. In other words, a security score may be determined for each authentication factor. In some embodiments, the per-authentication factor security scores (for each authentication factor) may be weighted and summed to determine a security score associated with the plurality of authentication factors.

Example embodiments may also authorize one or more actions based on a successful verification of at least a subset of the plurality of authentication factors. In some embodiments, the one or more actions may be authorized based on a comparison of the computed security score and a security score threshold that indicates a security score necessary to authorize a particular action. In some embodiments, if one or more actions are not authorized, a second authentication request may be received including a second plurality of authentication factors that may be verified and authorized based on the verified second plurality of authentication factors. Additionally, in some embodiments, if the one or more actions are not authorized, another computing device may be leveraged to obtain authentication factors about the individual (e.g., a computing device not associated with the individual, such as an ATM, a computing device associated with a trusted entity, and/or the like). In addition, example embodiments may identify an exogenous context, such as a natural disaster, weather emergency, a recent power outage, or the like that impacts the availability of certain authentication factors about an individual, and modify the requirements necessary for authorization based on the identified exogenous context.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments in general terms above, reference will now be made to the accompanying drawings, which are not necessarily drawn to scale. Some embodiments may include fewer or more components than those shown in the figures.

DETAILED DESCRIPTION

Figure 1:
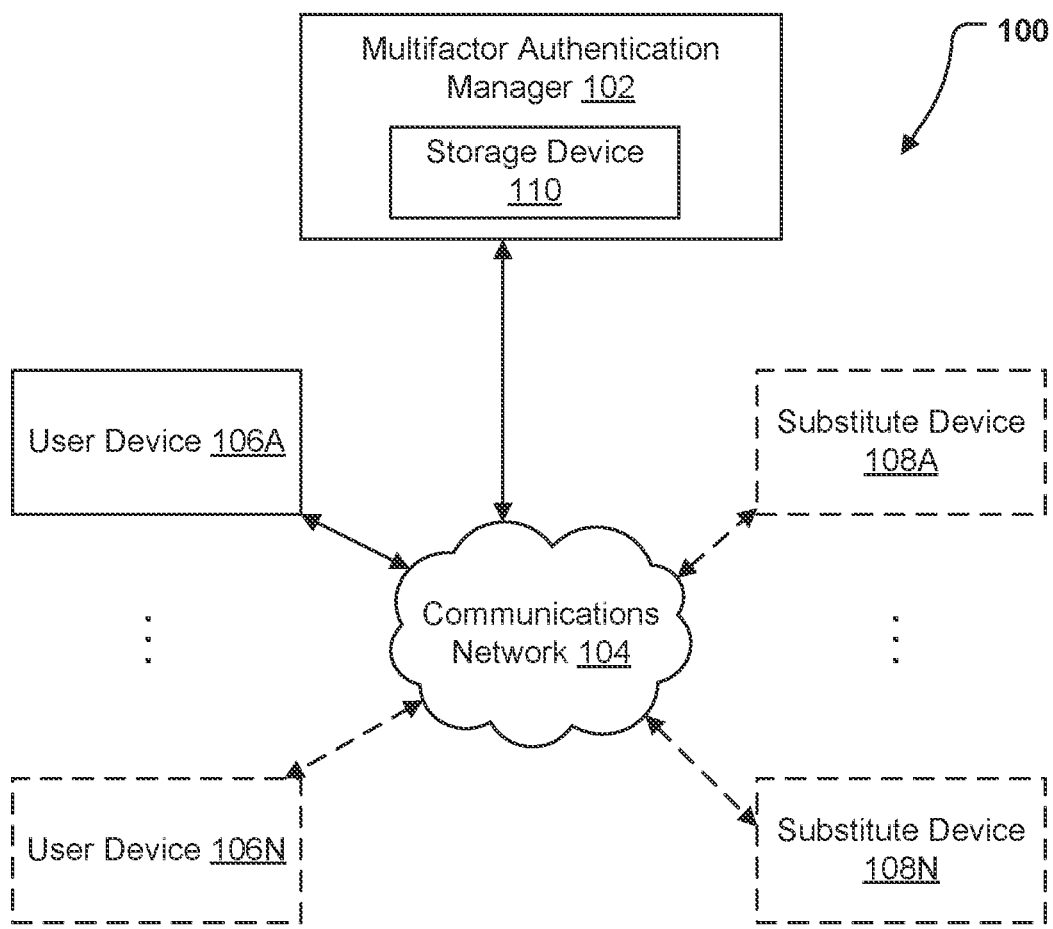
FIG. 1 illustrates a system in which some example embodiments may be used

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

The term "computing device" refers to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" refers to any computing device capable of functioning as a server, such as a master exchange server, web server, mail server, document server, or any other type of server. A server may be a dedicated computing device or a server module (e.g., an application) hosted by a computing device that causes the computing device to operate as a server.

The term "authentication request" refers to an electronic request to authenticate a session with an individual. The authentication request may indicate one or more actions requested by the individual that require authentication. In some embodiments, the authentication request may be received by one or more computing devices via a channel of a network (e.g., a 6G cellular network). In some embodiments, an automatic trigger event may cause the transmission of an authentication request from a computing device. An automatic trigger event may include a temporal trigger event, a circumstantial trigger event, and/or the like. A temporal trigger event may take place based on rules and/or configurations that require an authentication request to be generated within a particular time period or at a particular point in time. A circumstantial trigger event may take place based on rules and/or configurations that require that an authentication request be generated in response to a set of conditions and/or criteria being met.

The term "authentication factor" refers to a factor that may be used to verify the identity of an individual and authenticate an individual. An authentication factor may be of any authentication factor category, such as knowledge factors, possession factors, inherence factors, location factors, or behavior factors. In some embodiments, knowledge factors require an individual to provide information, such as a personal identification number (PIN), password, or the like. In some embodiments, possession factors require an individual to possess a particular piece of information or a particular computing device. For example, a one-time password that is sent to a particular computing device (e.g., a trusted computing device) associated with an individual may be a possession factor. In some embodiments, inherence factors are based on unique characteristics associated with an individual. For example, a biometric marker such as a fingerprint, facial scan, iris scan, or the like may be an inherence factor. In some embodiments, location factors require that an individual or computing device associated with an individual is at a specific geographic location. For example, the geographic location of a computing device attempting to access a secured resource that requires authentication may be a location factor. In some embodiments, a behavior factor is based on actions taken by an individual. For example, a predefined gesture may be a behavior factor.

The term "channel" refers to a logical connection over a multiplexed medium that may be used for information transfer. For example, the information transfer may be a digital bit stream from one computing device to another computing device via a channel.

The term "signature authentication factor" refers to a data structure that may include an authentication factor of any authentication factor category associated with an individual. A plurality of signature authentication factors may be associated with an individual and stored in a storage device. In addition, a signature authentication factor may be associated with a time stamp indicating a date and/or time at which the signature authentication factor was generated or otherwise obtained. In some embodiments, the signature authentication factors may age and degrade over time causing the signature authentication factors to be periodically (e.g., annually, or the like) updated. In some embodiments, a signature authentication factor may be referenced to verify a received authentication factor.

The term "security score" refers to a computed score describing a similarity between two or more pieces of data (e.g., a signature authentication factor and a received authentication factor). In some embodiments, the security score is a numerical score. In some embodiments, a security score may be converted into a categorical result (e.g., a tier classification (e.g., tier 1/tier 2/tier 3), a color-coded classification (e.g., green/yellow/red), or some other categorical classification). For example, a plurality of signature authentication factors compared to a plurality of authentication factors may yield a high security score indicating high similarity between the plurality of signature authentication factors and the plurality of authentication factors. In embodiments in which the security score is a numerical score, the security score may be computed by calculating a distance (e.g., a Hamming distance) between two arrays describing the plurality of signature authentication factors and plurality of authentication factors. In some embodiments, the Hamming distance may be normalized to produce the security score. In some embodiments, a security score may be computed describing the similarity between a singular signature authentication factor and a singular authentication factor. Further, in some embodiments, each similarity score may be weighted based on the authentication factor category. For example, a possession factor may be weighted differently than an inherence factor based on a predetermined security level for each authentication factor category.

The term "security scoring model" refers to a computational model that is configured to process a plurality of signature authentication factors and/or a plurality of authentication factors to generate a security score that is indicative of the authenticity of the plurality of authentication factors. In some embodiments, the security scoring model may utilize a hash function to map data (e.g., plurality of signature authentication factors, plurality of authentication factors, or the like) of an arbitrary size to fix-size values. The security scoring model may use a locally sensitive hash function that allows for the comparison of multimedia authentication factors using its computed hash value. For example, the security scoring model may implement a perceptual hash function that is analogous if features of a multimedia (e.g., a facial image) are similar. In some embodiments, a perceptual hash function may use a block hash method that converts multimedia to grayscale, resizes the multimedia to a predefined target size (e.g., 16x16 pixels), flips the multimedia to identify the brightest corner, and binarizes the data through a conversion of the grayscale pixels to black and white pixels using a threshold. The binarized data may be input into an array, which describes the multimedia. The security scoring model may use the array for comparison against arrays of other multimedia to determine similarity between two different multimedia. For example, the security scoring model may receive a plurality of signature authentication factors and plurality of authentication factors as input such that the security scoring model may execute the block hash method, or the like which may generate a plurality of arrays, a first set of arrays for each authentication factor included in the plurality of signature authentication factors and a second set of arrays for each authentication factor included in the plurality of authentication factors. The security scoring model may then use the difference between the arrays of the same type (e.g., a signature authentication factor array for a fingerprint and an authentication factor array of a fingerprint) to generate a Hamming distance, which may be used to generate a per-authentication factor security score. The calculation of a per-factor security score may be repeated until each authentication factor included in the plurality of authentication factors has a calculated per-authentication factor security score. The per-authentication factor security scores may be weighted and summed to produce a security score. It will be appreciated that other methods for calculating similarity may be used in various embodiments.

The term "exogenous context" refers to an external condition that impacts the reception of the plurality of authentication factors associated with an individual. Exogenous context may be any event that limits the ability to provide or receive authentication factors about an individual, such as a natural disaster, power outage, or the like.

System Architecture

Example embodiments described herein may be implemented using any of a variety of computing devices or servers. To this end, FIG. 1 illustrates an example environment 100 within which various embodiments may operate. As illustrated, a multifactor authentication manager 102 may receive and/or transmit information via communications network 104 (e.g., a 6G cellular network) with any number of other devices, such as one or more of user devices 106A-106N and/or substitute devices 108A-108N.

In some embodiments, communications network 104 may be a 6G (sixth generation) cellular network. The 6G cellular network utilizes signals at the high end of the radio spectrum that may offer a data rate of 1 terabyte per second. The higher frequencies leveraged by the 6G cellular network may enable a higher capacity and reduced latency. In some embodiments, the reduced latencies permit simultaneous reception of data via a plurality of channels.

In addition, one or more computing devices (e.g., user device 106A through 106N) may use communications network 104 (e.g., a 6G cellular network) and leverage the benefits of a 6G network to simultaneously send data to the multifactor authentication manager 102. In some embodiments, each channel included in the plurality of channels may be dedicated to a particular authentication factor category. For example, knowledge factors may be transmitted via channel A, possession factors via channel B, inherence factors via channel C, location factors via channel D, behavior factors via channel E, or the like.

The multifactor authentication manager 102 may be implemented as one or more computing devices or servers, which may be composed of a series of components. Particular components of the multifactor authentication manager 102 are described in greater detail below with reference to apparatus 200 in connection with FIG. 2.

In some embodiments, the multifactor authentication manager 102 further includes a storage device 110 that comprises a distinct component from other components of the multifactor authentication manager 102. Storage device 110 may be embodied as one or more direct-attached storage (DAS) devices (such as hard drives, solid-state drives, optical disc drives, or the like) or may alternatively comprise one or more Network Attached Storage (NAS) devices independently connected to a communications network (e.g., communications network 104). Storage device 110 may host the software executed to operate the multifactor authentication manager 102. Storage device 110 may store information relied upon during operation of the multifactor authentication manager 102, such as various algorithms that may be used by the multifactor authentication manager 102, a plurality of signature authentication factors, data and documents to be analyzed using the multifactor authentication manager 102, or the like. In addition, storage device 110 may store control signals, device characteristics, and access credentials enabling interaction between the multifactor authentication manager 102 and one or more of the user devices 106A-106N or substitute devices 108A-108N.

The one or more user devices 106A-106N may be embodied by any computing devices known in the art, such as desktop or laptop computers, smartphones, smart devices, or the like. In addition, the one or more user devices may be internet of things devices (IoT). For example, appliances, cameras, doorbells, televisions, or the like, may be one or more user devices. Similarly, the one or more substitute devices 108A-108N may be embodied by any computing devices such as desktop or laptop computers, automated teller machines (ATM's), security cameras, or the like that are managed by an entity (e.g., a financial institution). For example, a financial institution A may manage three ATM's (e.g., substitute devices 108A-108C), financial institution B may manage two security cameras and two ATM's (e.g., substitute devices 108D-108G). The one or more user devices 106A-106N and the one or more substitute devices 108A-108N need not themselves be independent devices, but may be peripheral devices communicatively coupled to other computing devices.

Although FIG. 1 illustrates an environment and implementation in which the multifactor authentication manager interacts indirectly with a user via one or more of user devices 106A-106N and/or substitute devices 108A-108N, in some embodiments users may directly interact with the multifactor authentication manager 102 (e.g., via communications hardware of the multifactor authentication manager 102), in which case a separate user devices 106A-106N and/or substitute devices 108A-108N may not be utilized. Whether by way of direct interaction or indirect interaction via another device, a user may communicate with, operate, control, modify, or otherwise interact with the multifactor authentication manager 102 to perform the various functions and achieve the various benefits described herein.

Example Implementing Apparatuses

Figure 2:
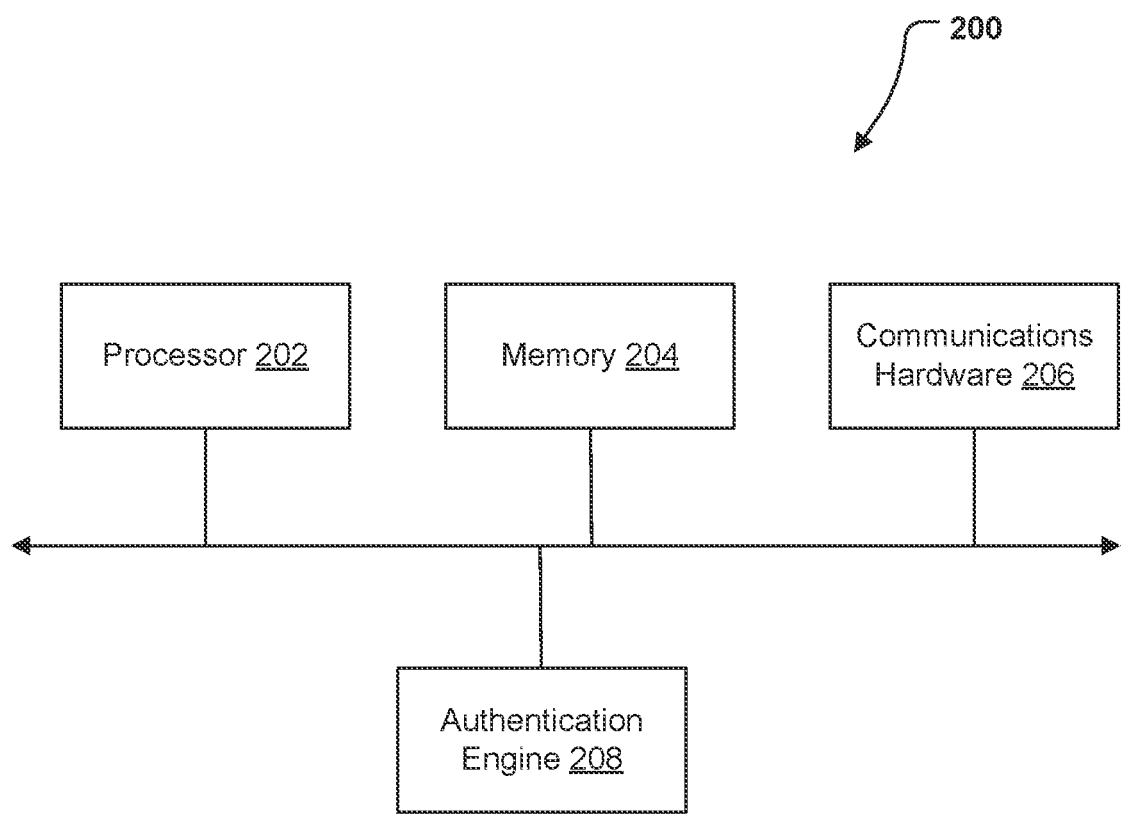
FIG. 2 illustrates a schematic block diagram of example circuitry embodying a system device that may perform various operations in accordance with some example embodiments described herein.

The multifactor authentication manager 102 (described previously with reference to FIG. 1) may be embodied by one or more computing devices or servers, shown as apparatus 200 in FIG. 2. The apparatus 200 may be configured to execute various operations described above in connection with FIG. 1 and below in connection with FIGS. 3-5. As illustrated in FIG. 2, the apparatus 200 may include processor 202, memory 204, communications hardware 206, and authentication engine 208 each of which will be described in greater detail below.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof.

The processor 202 may be configured to execute software instructions stored in the memory 204 or otherwise accessible to the processor. In some cases, the processor may be configured to execute hard-coded functionality. As such, whether configured by hardware or software methods, or by a combination of hardware with software, the processor 202 represent an entity (e.g., physically embodied in circuitry) capable of performing operations according to various embodiments of the present invention while configured accordingly. Alternatively, as another example, when the processor 202 is embodied as an executor of software instructions, the software instructions may specifically configure the processor 202 to perform the algorithms and/or operations described herein when the software instructions are executed.

Memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, software instructions, or the like, for enabling the apparatus to carry out various functions in accordance with example embodiments contemplated herein.

The communications hardware 206 may be any means such as a device or circuitry embodied in either hardware or a combination of hardware and software that is configured to receive and/or transmit data from/to a network and/or any other device, circuitry, or module in communication with the apparatus 200. In this regard, the communications hardware 206 may include, for example, a network interface for enabling communications with a wired or wireless communication network. For example, the communications hardware 206 may include one or more network interface cards, antennas, buses, switches, routers, modems, and supporting hardware and/or software, or any other device suitable for enabling communications via a network (e.g., a cellular network). Furthermore, the communications hardware 206 may include the processing circuitry for causing transmission of such signals to a network or for handling receipt of signals received from a network.

The communications hardware 206 may further be configured to provide output to a user and, in some embodiments, to receive an indication of user input. In this regard, the communications hardware 206 may comprise a user interface, such as a display, and may further comprise the components that govern use of the user interface, such as a web browser, mobile application, dedicated client device, or the like. In some embodiments, the communications hardware 206 may include a keyboard, a mouse, a touch screen, touch areas, soft keys, a microphone, a speaker, and/or other input/output mechanisms. The communications hardware 206 may utilize the processor 202 to control one or more functions of one or more of these user interface elements through software instructions (e.g., application software and/or system software, such as firmware) stored on a memory (e.g., memory 204) accessible to the processor 202.

In addition, the apparatus 200 further comprises an authentication engine 208 that verifies at least a subset of the plurality of authentication factors in parallel. In particular, the authentication engine 208 may leverage a model, such as the security scoring model, by applying, in parallel, the security scoring model to each of the plurality of signature authentication factors and the plurality of authentication factors to ultimately generate a security score that may be used to verify the plurality of authentication factors. The authentication engine 208 may further authorize one or more actions based on a successful outcome of a verification operation. The authentication engine 208 may utilize processor 202, memory 204, or any other hardware component included in the apparatus 200 to perform these operations, as described in connection with FIGS. 3-5 below. The authentication engine 208 may further utilize communications hardware 206 to gather data from a variety of sources (e.g., user device 106A through user device 106N, substitute device 108A through substitute device 108N, or storage device 110, as shown in FIG. 1), and/or exchange data with a user, and in some embodiments may utilize processor 202 and/or memory 204 to perform any or more of the above operations.

Although components 202-208 are described in part using functional language, it will be understood that the particular implementations necessarily include the use of particular hardware. It should also be understood that certain of these components 202-212 may include similar or common hardware. For example, the authentication engine 208 may at times leverage use of the processor 202, memory 204, or communications hardware 206, such that duplicate hardware is not required to facilitate operation of these physical elements of the apparatus 200 (although dedicated hardware elements may be used for any of these components in some embodiments, such as those in which enhanced parallelism may be desired). Use of the term "engine" with respect to elements of the apparatus therefore shall be interpreted as necessarily including the particular hardware configured to perform the functions associated with the particular element being described. Of course, while the terms "engine" should be understood broadly to include hardware, in some embodiments, the term "engine" may in addition refer to software instructions that configure the hardware components of the apparatus 200 to perform the various functions described herein.

Although the authentication engine 208 may leverage processor 202, memory 204, or communications hardware 206 as described above, it will be understood that authentication engine 208 may include one or more dedicated processor, specially configured field programmable gate array (FPGA), or application specific interface circuit (ASIC) to perform its corresponding functions, and may accordingly leverage processor 202 executing software stored in a memory (e.g., memory 204), or communications hardware 206 for enabling any functions not performed by special-purpose hardware. In all embodiments, however, it will be understood that authentication engine 208 comprise particular machinery designed for performing the functions described herein in connection with such elements of apparatus 200.

In some embodiments, various components of the apparatuses 200 may be hosted remotely (e.g., by one or more cloud servers) and thus need not physically reside on the corresponding apparatus 200. For instance, some components of the apparatus 200 may not be physically proximate to the other components of apparatus 200. Similarly, some or all of the functionality described herein may be provided by third party circuitry. For example, a given apparatus 200 may access one or more third party circuitries in place of local circuitries for performing certain functions.

As will be appreciated based on this disclosure, example embodiments contemplated herein may be implemented by an apparatus 200. Furthermore, some example embodiments may take the form of a computer program product comprising software instructions stored on at least one non-transitory computer-readable storage medium (e.g., memory 204). Any suitable non-transitory computer-readable storage medium may be utilized in such embodiments, some examples of which are non-transitory hard disks, CD-ROMs, DVDs, flash memory, optical storage devices, and magnetic storage devices. It should be appreciated, with respect to certain devices embodied by apparatus 200 as described in FIG. 2, that loading the software instructions onto a computing device or apparatus produces a special-purpose machine comprising the means for implementing various functions described herein.

Having described specific components of example apparatuses 200, example embodiments are described below in connection with a series of flowcharts.

Example Operations

Figure 3:
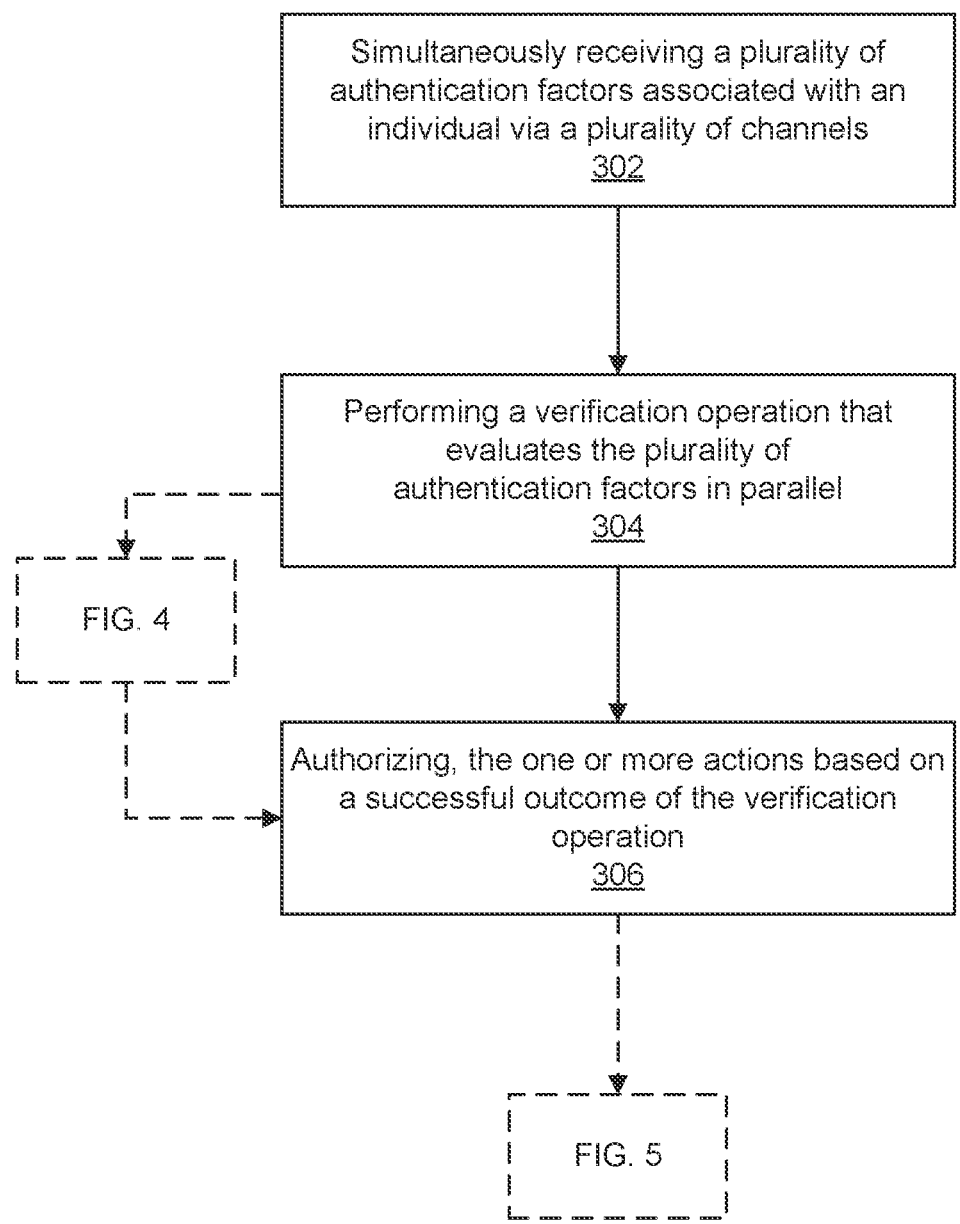
FIG. 3 illustrates an example flowchart for simultaneous multifactor authentication, in accordance with some example embodiments described herein.
Figure 4:
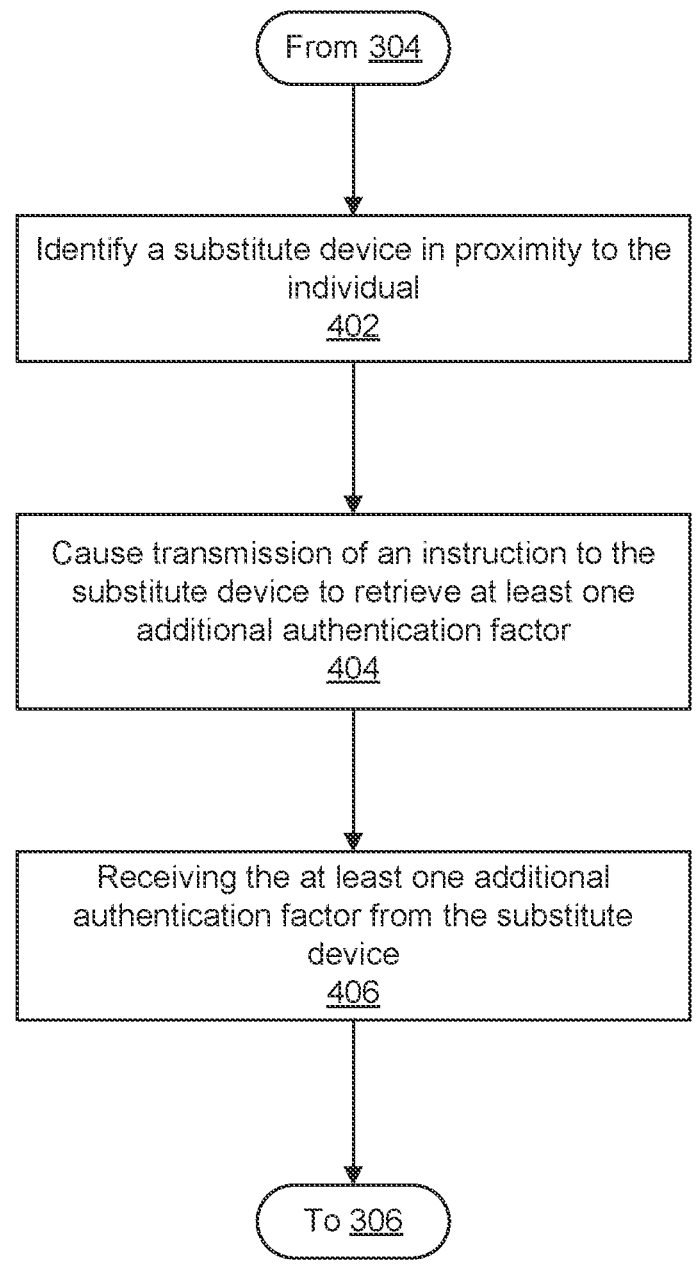
FIG. 4 illustrates an example flowchart for using a substitute device to obtain and transmit at least one authentication factor, in accordance with some example embodiments described herein.
Figure 5:
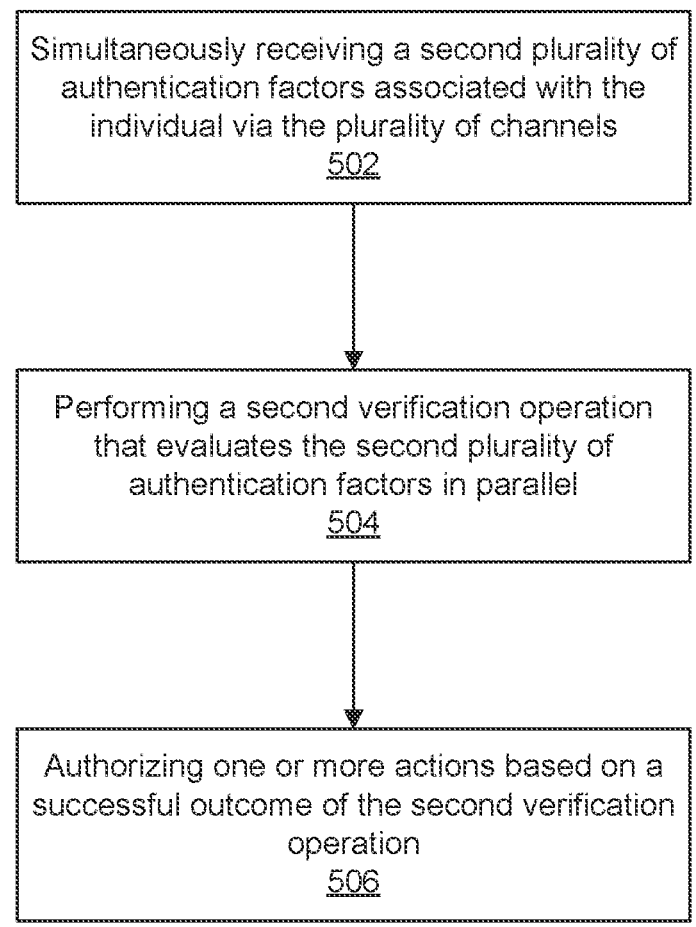
FIG. 5 illustrates an example flowchart for using a second plurality of authentication factors to authorize one or more actions, in accordance with some example embodiments described herein.

Turning to FIGS. 3, 4 and 5, example flowcharts are illustrated that contain example operations implemented by example embodiments described herein. The operations illustrated in FIGS. 3, 4 and 5 may, for example, be performed by the multifactor authentication manager 102 shown in FIG. 1, which may in turn be embodied by an apparatus 200, which is shown and described in connection with FIG. 2. To perform the operations described below, the apparatus 200 may utilize one or more of processor 202, memory 204, communications hardware 206, authentication engine 208, and/or any combination thereof. It will be understood that user interaction with the multifactor authentication manager 102 may occur directly via communications hardware 206, or may instead be facilitated by a user device 106A through user device 106N, as shown in FIG. 1, and which may have similar or equivalent physical componentry facilitating such user interaction.

Turning first to FIG. 3, example operations are shown for simultaneous multifactor authentication.

As shown by operation 302, the apparatus 200 includes means, such as processor 202, memory 204, communications hardware 206, or the like, for simultaneously receiving a plurality of authentication factors associated with an individual via a plurality of channels. The plurality of authentication factors may be security credentials used to verify the identity of an individual and authenticate an individual. In some embodiments, the plurality of authentication factors may be of any authentication factor category, such as knowledge factors, possession factors, inherence factors, location factors, or behavior factors. For example, the plurality of authentication factors simultaneously received may include a biometric marker (e.g., a facial image), a PIN, location data, one-time password, or the like.

In some embodiments, the plurality of authentication factors may be transmitted from one or more computing devices associated with the individual (e.g., user device 106A through user device 106N, or the like) via a plurality of channels of a cellular network (e.g., a 6G cellular network, such as communications network 104, shown in FIG. 1) simultaneously to the apparatus 200. In some embodiments, the 6G cellular network may utilize higher frequencies (e.g., millimeter waves of 30 to 300 GHz and terahertz waves ranging from 300 to 3000 GHz) than its predecessor, 5G cellular networks which leverage 2 to 30 GHz waves. The higher frequencies leveraged by a 6G cellular network may enable a higher capacity and reduced latency. In some embodiments, the reduced latencies offered by such cellular networks may permit the transmission of data via a larger number of channels (e.g., leveraging intermediary nodes that historically may not have been able to facilitate distribution of data), and in doing so may permit enhanced parallelism via the simultaneous reception of data via a plurality of channels.

In some embodiments, the authentication factors included in the plurality of authentications may be simultaneously transmitted via separate channels included in the plurality of channels. For example, knowledge factors may be transmitted via channel A, possession factors via channel B, inherence factors via channel C, location factors via channel D, behavior factors via channel E, or the like. In some embodiments the authentication factor type (e.g., PIN, location data, facial data, or the like) may determine the channel used to transmit the authentication factor. In some embodiments, the same authentication factor may be transmitted from multiple computing devices associated with the individual (e.g., user device 106A through user device 106N, or the like). For example, authentication factor A may be transmitted to the apparatus 200 via channel A of a 6G cellular network (e.g., communications network 104, FIG. 1) from user device 106A, 106B, and 106C. User device 106A, 106B, and 106C may use the same communication channel included in the plurality of communication channels because the user devices are simultaneously transmitting the same authentication factor and hence the same authentication factor category. Alternatively, a separate communication channel may be used for each computing device transmitting the authentication factor to the apparatus 200.

In some embodiments, the plurality of authentication factors may be received in response to receiving a first authentication request. A first authentication request may be a request to authenticate a first session with an individual. The first authentication request may indicate one or more actions requested by the individual that require multifactor authentication. In some embodiments, multifactor authentication rules may describe which actions require multifactor authentication. The multifactor authentication rules may be stored in a storage device accessible to the components of the apparatus 200 (e.g., storage device 110, memory 204, or the like). The one or more actions may be a real-world step or operation. In some embodiments, one or more actions may be any requested operation that requires multifactor authentication. Some example one or more actions may be, entering a smart home, withdrawal of funds, changing a personal profile, changing beneficiary information, completing a transaction, opening a new financial account, or the like.

In some embodiments, the first authentication request may be received from a computing device (e.g., user device 106A, or the like) via a channel of a network (e.g., a 6G cellular network such as communications network 104). In some embodiments, the authentication request may be received simultaneously with the reception of the plurality of authentication factors. For example, a plurality of channels of a 6G cellular network may simultaneously receive the first authentication request and the plurality of authentication factors. Alternatively, the first authentication request may be received prior to the simultaneous reception of the plurality of authentication factors. For example, the first authentication request may be received and trigger the simultaneous transmission of a plurality of authentication factors from one or more computing devices (e.g., user devices 106A-106N, substitute devices 108A-108N, or the like).

In some embodiments, an automatic trigger event may cause the transmission of a first authentication request from a computing device (e.g., user devices 106A-106N, substitute devices 108A-108N, or the like). An automatic trigger event may include a temporal trigger event, a circumstantial trigger event, and/or the like. A temporal trigger event may take place based on rules and/or configurations that require an authentication request to be generated within a particular time period or at a particular point in time. For example, assume an individual routinely checks their online banking accounts every night at 9:00 pm. The temporal trigger may be configured to cause transmission of a first authentication request to authenticate an individual allowing the individual to access their online banking accounts. A circumstantial trigger event may take place based on rules and/or configurations that require that an authentication request be generated in response to a set of conditions and/or criteria being met. For example, a circumstantial trigger may be configured to authenticate an individual when the individual encounters a request for payment (e.g., checkout on a website, paying utilities, or the like) on a computing device associated with the individual (e.g., user device 106A through user device 106N).

As shown by operation 304, the apparatus 200 includes means, such as processor 202, memory 204, communications hardware 206, authentication engine 208, or the like, for performing a verification operation that evaluates the plurality of authentication factors in parallel. In some embodiments, parallelism may be achieved by the authentication engine 208 by simultaneously comparing each of the plurality of authentication factors to corresponding signature authentication factors of the plurality of signature authentication factors. The plurality of signature authentication factors may be previously collected and stored (e.g., in a storage device such as storage device 110, memory 204, or the like) and may comprise authentication factors of any authentication factor category associated with an individual. The signature authentication factors may be associated with a time stamp indicating the length of time since the signature authentication factors were acquired. In some embodiments, after a predetermined set amount of time (e.g., predetermined by a financial institution that adjudicates the simultaneous multifactor authentication), communications hardware 206 may prompt the individual via a message to a computing device associated (e.g., user device 106A through user device 106N) with the individual to update the plurality of signature authentication factors. Alternatively, the communications hardware 206 may passively (e.g., without notifying the individual) update the plurality of signature authentication factors.

In some embodiments, the received plurality of authentication factors may be at least a subset of the signature authentication factors to allow a comparison between the plurality of authentication factors and the plurality of signature authentication factors. For example, if the plurality of signature authentication factors includes a fingerprint, PIN, one time password to a computing device, location data from a computing device, and facial scan, the plurality of authentication factors must be included in the plurality of signature authentication factors, therefor the plurality of authentication factors may be a fingerprint and location data from a computing device.

In some embodiments, authentication engine 208 may evaluate the plurality of authentication factors by determining a security score. A security score may be a computed score describing the authenticity of data based on the similarity between two or more pieces of data (e.g., (i) a plurality of signature authentication factors, or (ii) at least a subset of the plurality of authentication factors). In some embodiments, the determined security score is a numerical score (e.g., a score between 0 and 1), which in other embodiments the determined security score may be converted into a categorical result (e.g., tier 1/tier 2/tier, green/yellow/red, or some other categorical classification). For example, a comparison of a plurality of signature authentication factors to a plurality of authentication factors may yield a high security score indicating similarity between the plurality of signature authentication factors and the plurality of authentication factors. Where the determined security score is a numerical score, the security score may be computed by calculating a Hamming distance between two arrays describing the plurality of signature authentication factors and plurality of authentication factors. The Hamming distance may be normalized to produce the security score. In some embodiments, to enable parallelism (which may enhance computational speed), a per-authentication factor security score may be computed describing the security of a singular authentication factor based on the similarity between the singular authentication factor and a corresponding singular signature authentication factor. Further, each per-authentication factor security score may be weighted based on the authentication factor category. For example, a possession factor may be weighted differently than an inherence factor based on a predetermined security level for each authentication factor category.

In some embodiments, authentication engine 208 may leverage a security scoring model to determine per-authentication factor security scores that enable performing verification operations that evaluate the plurality of authentication factors in parallel. The security scoring model may be a computational model that is configured to process a plurality of signature authentication factors and/or a plurality of authentication factors to generate a security score that is indicative of the authenticity of the plurality of authentication factors. In some embodiments, the security scoring model may utilize a hash function to map data (e.g., plurality of signature authentication factors, plurality of authentication factors, or the like) of an arbitrary size to fix-size values. The security scoring model may use a locally sensitive hash function that allows for the comparison of multimedia authentication factors (e.g., a facial image) using its computed hash value. For example, the security scoring model may implement a perceptual hash function that is analogous if features of a facial image are similar.

In some embodiments, a perceptual hash function may use a block hash method that converts multimedia to grayscale, resizes the multimedia to a predefined target size (e.g., 16×16 pixels), flips the multimedia to identify the brightest corner, and binarizes the data through a conversion of the grayscale pixels to black and white pixels using a threshold. The binarized data may be input into an array, which describes the multimedia. The security scoring model may use the array for comparison against arrays of other multimedia to determine similarity between two different multimedia. For example, the security scoring model may receive a plurality of signature authentication factors and plurality of authentication factors as input such that the security scoring model may execute the block hash method, or the like which may generate a plurality of arrays, a first set of arrays for each authentication factor included in the plurality of signature authentication factors and a second set of arrays for each authentication factor included in the plurality of authentication factors. The security scoring model may then use the difference between the arrays of the same type (e.g., a signature authentication factor array for a fingerprint and an authentication factor array of a fingerprint) to generate a Hamming distance, which may be used to generate a per-factor security score. The calculation of a per-authentication factor security score may be repeated until each authentication factor included in the plurality of authentication factors has a calculated per-authentication factor security score. The per-authentication factor security scores may be weighted and summed to produce a security score. It will be appreciated that other methods for calculating similarity may be used in various embodiments.

In some embodiments, the security score required to authenticate a session with an individual to cause one or more actions (hereinafter referred to as a security score threshold) may be modified if authentication engine 208 identifies an exogenous context. The modification of the required security score may include lowering the security score threshold associated with one or more actions included in the authentication request. An exogenous context may be an external condition that impacts the reception of the plurality of authentication factors associated with an individual. For example, an exogenous context may be any event that imposes a disability to receive authentication factors about an individual, such as a natural disaster, power outage, or the like.

In some embodiments, authentication engine 208 may reference a set of exogenous context rules located in a storage device (e.g., storage device 110, memory 204, or the like) to identify occurrence of an exogenous context. For example, the set of exogenous context rules may describe if a certain percentage of incoming authentication requests include only a subset of the plurality of authentication factors, authentication engine 208 may then determine an occurrence of an exogenous context. In some embodiments, an individual may use a computing device (e.g., user device 106A, or the like) to transmit a message via a network (e.g., communications network 104, FIG. 1) to the apparatus 200 (e.g., communications hardware 206) describing an exogenous context. For example, an individual may transmit in conjunction with the plurality of authentication factors (or a subset of the plurality of authentication factors) an exogenous context message describing a recent power outage, such as "power outage due to weather conditions".

The authentication engine 208 may use any suitable techniques to identify the exogenous context in the exogenous context message, such as optical character recognition (OCR), natural language processing (NLP), searching algorithms, machine learning models, and/or the like. For example, authentication engine 208 may OCR any data in the exogenous context message, if needed, and then search for an indicator of exogenous context. For example, the authentication engine 208 may search for weather emergencies (e.g., blizzard, earthquake, flooding, or the like), which may act as an identifier to identify occurrence of an exogenous context. In some embodiments, the authentication engine may store the identified exogenous context message in a storage device (e.g., memory 204, storage device 110) and metadata about the exogenous context message to aid the authentication engine 208 in deducing an exogenous context for other individuals transmitting a subset of a plurality of authentication factors. For example, a first individual may transmit a subset of the plurality of authentication factors and an exogenous context message. The apparatus 200 (e.g., communications hardware 206) may also receive a subset of the plurality of authentications factors from a second individual which may not include an exogenous context message. Authentication engine 208 may then determine if the second individual is within a predefined proximity to the first individual by searching for location data associated with the subset of plurality of authentication data, metadata about the exogenous context message, or the like. If the second individual is located within a predefined proximity to the first individual experiencing an exogenous context, the authentication engine 208 may also identify an exogenous context for the second individual.

In some embodiments (as described above), the authentication engine 208 may retrieve the computed security score and compare the computed security score to the security score threshold. The security score threshold may be satisfied if at least a subset of the plurality of authentication factors per-authentication factor security score meets and/or exceeds the security threshold. For example, one or more actions with a security score threshold of 40 may require less authentication factors to be verified than one or more actions with a security score threshold of 90.

In some embodiments, the security score may fail to satisfy the security score threshold associated with the one or more actions included in the first authentication request. Authentication engine 208 may initiate a second simultaneous reception of the plurality of authentication factors from a computing device not associated with the individual (e.g., substitute device 108A through substitute device 108N, or the like) to overcome the security score threshold, which is further described below in connection to FIG. 4.

As shown by operation 402, the apparatus 200 includes means, such as processor 202, memory 204, communications hardware 206, authentication engine 208, or the like, for identifying a substitute device in proximity to the individual. In some embodiments, the substitute device may be any computing device connected to the apparatus 200 via a cellular network (e.g., a 6G cellular network, such as communications network 104, shown in FIG. 1) that is not associated with an individual and can transmit at least one authentication factor regarding the individual to the apparatus 200. In addition, the substitute device may be in close proximity to the individual. In some embodiments, close proximity may be a predefined range that is predetermined by a financial institution that adjudicates the one or more actions. For example, an ATM at the financial institution that adjudicates one or more actions may be a substitute device.

In some embodiments, to gain more authentication factors after an unsuccessful verification operation using the plurality of authentication factors, authentication engine 208 may search for location data associated with the plurality of authentication factors. In some embodiments, the location data may be metadata associated with an authentication factor (e.g., a face scan received from a desktop computer located at a particular location). Alternatively, an authentication factor may be location data. For example, assume an individual is located inside of a location associated with a financial institution, such as a banking branch. The previously transmitted plurality of authentication factors (as discussed above in connection with operation 302) may be transmitted via channels of a 6G cellular network to the apparatus 200 (e.g., communications hardware 206) and comprise location data associated with the individuals computing devices (e.g., user device 106A through user device 106N). Authentication engine 208 may then reference the received location data associated with the plurality of authentication factors to identify substitute devices (e.g., substitute device 108A through substitute device 108N) in the financial institution.

In some embodiments, authentication engine 208 may search a database stored in a storage device (e.g., memory 204, storage device 110, or the like) that may include data describing substitute devices and their respective locations to identify substitute devices. The database may store the locations and substitute devices in the form of key-value pairs where the key portion specifies a location, and the value portion specifies substitute devices at a particular location. For example, a key of location A may be associated with substitute device A, substitute device B, and substitute device C, which may all be located at location A and used to gather at least one authentication factor about an individual.

As shown by operation 404, the apparatus 200 includes means, such as processor 202, memory 204, communications hardware 206, or the like, for causing transmission of an instruction to the substitute device to retrieve at least one additional authentication factor of the subset of the plurality of authentication factors. In some embodiments, the retrieved at least one additional authentication factor may be any authentication factor from the subset of plurality of authentication factors received in response to/along with the first authentication request (operation 302).

In some embodiments, the apparatus 200 (e.g., communications hardware 206) may cause transmission of an instruction to an identified substitute device in proximity (e.g., a predefined radius around the individual). In some embodiments, the instruction may include information describing the at least one additional authentication factor of the subset of the plurality of authentication factors that may increase the security score to overcome a security score threshold. For example, an instruction may indicate that an inherence factor must be captured by the substitute device to overcome the security score threshold for the individual to complete one or more actions.

In some embodiments, in response to an unsuccessful outcome of a verification operation using the plurality of authentication factors, the apparatus 200 (e.g., communications hardware 206) may transmit instruction that describes at least one additional authentication factor of the subset of the plurality of authentication factors, which may be required to be re-acquired to authorize one or more actions, through a 6G cellular network (e.g., communications network 104, as shown in FIG. 1) to an identified substitute device (e.g., substitute device 108A, or the like). For example, assume an unsuccessful outcome of a verification operations associated with an inherence factor (e.g., the inherence factor receiving a low security score). The identified substitute device 108A may receive instructions from the apparatus 200 to passively capture an inherence factor, which may replace the previously received (along with the first authentication request) inherence factor in the plurality of authentication factors. In some embodiments, the instructions transmitted to the substitute device 108A may cause the substitute device to passively capture at least one authentication factor about the individual. For example, continuing with the above example where the identified substitute device 108A received instructions to passively capture an inherence factor, the substitute device 108A, which may be a security camera in a brick-and-mortar branch of a financial institution, may passively capture an inherence authentication factor (e.g., biometric data, such as facial data) by passively recording an individual.

Alternatively, the identified substitute device may actively prompt the individual to retrieve at least one additional authentication factor of the subset of the plurality of authentication factors. For example, the apparatus 200 (e.g., communications hardware 206) may transmit a message to a computing device that previously transmitted the subset of the plurality of authentication factors (e.g., user device 106A, or the like). The message may describe instructions for the individual to submit an authentication factor to a trusted computed device not associated with the individual (e.g., substitute device 108A, or the like). For example, a message may be presented on user device 106A that states "please transmit at least one additional authentication factor" from substitute device 108A prompting the individual to approach and to transmit at least one authentication factor from substitute device 108A.

In some embodiments, a substitute device (e.g., substitute device 108A, or the like) may leverage a computing device associated with the individual (e.g., user device 106A, or the like) to transmit at least one additional authentication factor of the subset of the plurality of authentication factors. For example, following an unsuccessful outcome of a verification operation using the plurality of authentication factors, substitute device 108A may be prompted by the apparatus 200 (e.g., communications hardware 206) to retrieve at least one additional authentication factor of the subset of the plurality of authentication factors. For example, substitute device 108A may transmit instructions causing user device 106A to transmit an authentication factor via a 6G cellular network (e.g., communications network 104, as shown in FIG. 1) to the identified substitute device 108A.

As shown by operation 406, the apparatus 200 includes means, such as processor 202, memory 204, communications hardware 206, authentication engine 208, or the like, for receiving the at least one additional authentication factor from the substitute device. In some embodiments, the at least one additional authentication factor may be received by the apparatus 200 (e.g., communications hardware 206). For example, substitute device 108A may transmit the at least one additional authentication factor via a 6G cellular network (e.g., communications network 104, as shown in FIG. 1) to the communications hardware 206.

In some embodiments, the authentication engine 208 may leverage the security scoring model to compute a new security score that includes the at least one additional authentication factor from a substitute device. In some embodiments, the initially received subset of the plurality of authentication factors, the plurality of signature authentication factors, and the at least one additional authentication factor received from the substitute device may be evaluated by inputting the authentication factors (e.g., subset of the plurality of authentication factors, plurality of signature authentication factors, and the at least one additional authentication factor) into the security scoring model. The security scoring model may then replace the authentication factor included in the subset of the plurality of authentication factors that is the same authentication factor type as the at least one additional authentication factor transmitted by the identified substitute device (operation 404). For example, assume the security scoring model is input the plurality of signature authentication factors, a subset of the plurality of authentication factors which may include a PIN, location data, and a fingerprint, and at least one additional authentication factor which may be a fingerprint received from the substitute device. The security scoring model may replace the fingerprint in the subset of the plurality of authentication factors with the fingerprint included in the at least one additional authentication factor to produce a security score.

In some embodiments, the new security score may be evaluated similarly to the original security score (calculated in operation 304). For example, the plurality of signature authentication factors may be compared to the subset of the plurality of authentication factors, where the plurality of authentication factors includes the at least one additional authentication factor from a substitute device. Further, the new security score may be computed by a weighted summation of a plurality of per-component security scores. For example, the new security score may be a weighted summation of a per-knowledge factor security score, per-inherence factor security score, and per-possession factor security score. Alternatively, the new security score may be evaluated (e.g., calculated) as an average and/or weighted average of the security score associated with the first authentication request that resulted in the unsuccessful outcome of a verification operation using at least a subset of the authentication factors and the new security score that includes the at least one additional authentication factor from a substitute device.

In some embodiments, the new security score may satisfy the security score threshold associated with one or more actions included in the first authentication request thereby causing a successful outcome of the verification operation and the execution of the one or more actions. Authorizing the one or more actions is described further below in connection with FIG. 3.

Returning to FIG. 3, as shown by operations 306, the apparatus 200 includes means, such as processor 202, memory 204, communications hardware 206, authentication engine 208, or the like, for authorizing the one or more actions based on a successful outcome of the verification operation. In some embodiments, successful outcome of the verification may describe that the calculated security score (operation 304 and operation 406) must meet and/or exceed the security score threshold associated with one or more actions included in the first authentication request. For example, one or more actions associated with a security score threshold of 90 may require that the calculated security score based off of the plurality of received authentication factors to meet a score of 90.

In some embodiments, authorization of the one or more actions based on the successful outcome of the verification operation may be passive (e.g., with no notification provided to the individual), and the authentication engine 208 may execute the one or more actions. Alternatively, the apparatus 200 (e.g., communications hardware 206) may cause transmission of a message or indicator (e.g., a green checkmark, or the like) to a computing device associated with the individual (e.g., user device 106A through user device 106N) that indicates a successful authorization of one or more actions. In addition, the indicator may remain present on a computing device associated with the individual as long as the authenticated session is currently active.

In some embodiments, after a first authentication request is authorized and one or more actions associated with the first authentication request are executed, an individual may again request to execute one or more actions. In some embodiments, the one or more actions may be automatically authorized if the security score threshold of the requested one or more actions is below the security score for the current authenticated session. However, in some embodiments the one or more actions may require a security score that satisfies the security score threshold associated with the authenticated session that is associated with the first authentication request. Receiving, verifying, and authenticating a second plurality of authentication factors to authorize one or more actions that exceed a previous security score threshold is described further below in relation to FIG. 5.

As shown by operation 502, the apparatus 200 includes means, such as processor 202, memory 204, communications hardware 206, or the like, for simultaneously receiving a second plurality of authentication factors associated with an individual via a plurality of channels. The second plurality of authentication factors may be of any authentication factor category, such as knowledge factors, possession factors, inherence factors, location factors, or behavior factors. In some embodiments, the second plurality of authentication factors may include more authentication factors than required for the first authentication request. In addition, the second plurality of authentication factors may also include a subset of authentication factors that are identical to a subset and/or the entirety of the plurality of the authentication factors associated with the first authentication request.

In some embodiments, the second plurality of authentication factors may be transmitted from one or more computing devices associated with the individual (e.g., user device 106A through user device 106N, or the like) via a plurality of channels of a 6G cellular network (e.g., communications network 104, shown in FIG. 1) simultaneously to the apparatus 200. In some embodiments, each authentication factor category may be simultaneously transmitted via separate channels included in the plurality of channels.

In some embodiments, reception of the second plurality of authentication factors may be in response to receiving a second authentication request. A second authentication request may be a request to authenticate a second session with an individual after a first session is already established. The second authentication request may indicate one or more actions requested by the individual that require multifactor authentication because the security score threshold associated with the one or more actions exceeds the security score of the first authenticated session associated with the first authentication request.

In some embodiments, the second authentication request may be received by a computing device (e.g., user device 106A, or the like) via a channel of a network (e.g., a 6G cellular network). In some embodiments, the second authentication request may be received simultaneously with the reception of the second plurality of authentication factors. For example, a plurality of channels of a 6G cellular network may simultaneously receive the second authentication request and second plurality of authentication factors. Alternatively, the second authentication request may be received prior to the simultaneous reception of the second plurality of authentication factors. For example, the second authentication request may be received and trigger the simultaneous transmission of the second plurality of authentication factors from one or more computing devices (e.g., user devices 106A-106N, substitute devices 108A-108N, or the like).

In some embodiments, an automatic trigger event may cause the transmission of a second authentication request from a computing device (e.g., user devices 106A-106N, substitute devices 108A-108N, or the like). In some embodiments, the automatic trigger event may include a temporal trigger event, a circumstantial trigger event, and/or the like, such that authentication is needed to perform one or more actions with a security score that satisfies the security score threshold of the first authenticated session.

As shown by operation 504, the apparatus 200 includes means, such as processor 202, memory 204, communications hardware 206, authentication engine 208, or the like, for performing a second verification operation that evaluates the second plurality of authentication factors in parallel. In some embodiments, the simultaneously received second plurality of authentication factors may be verified in parallel (e.g., via multithreading) by a comparison of the second plurality of authentication factors to the plurality of signature authentication factors (operation 304) stored in a storage device (e.g., storage device 110, memory 204, or the like).

In some embodiments, in addition to including more authentication factors than the initially received plurality of authentication factors (operations 302), the received second plurality of authentication factors may also be at least a subset of the signature authentication factors to allow a comparison between the second plurality of authentication factors and the signature authentication factors. For example, if the signature authentication factors include a fingerprint, PIN, one-time password to a computing device, location data from a computing device, and facial scan and the plurality of authentication factors include a fingerprint and location data from a computing device, the second plurality of authentication factors may include a fingerprint, PIN, one-time password, and location data from a computing device.

In some embodiments, authentication engine 208 may verify at least a subset of the second plurality of authentication factors by computing a security score based on the second plurality of authentication factors. In some embodiments, a per-authentication factor security score may be computed describing the security of the second authentication factors by describing similarity between a singular signature authentication factor and a singular authentication factor included in the second plurality of authentication factors. In some embodiments, authentication engine 208 may leverage the security scoring model to calculate the security score. The security scoring model may be input the plurality of signature authentication factors and/or the second plurality of authentication factors to generate (e.g., output) a security score that is indicative of the authenticity of the second plurality of authentication factors. In some embodiments, the authentication engine 208 may retrieve the computed security score and compare the computed security score to the security score threshold associated with the one or more actions in second authentication request to verify the second plurality of authentication factors.

As shown by operation 506, the apparatus 200 includes means, such as processor 202, memory 204, communications hardware 206, authentication engine 208, or the like, for authorizing one or more actions associated with the second authentication request. In some embodiments, authorizing one or more actions associated with the second authentication request includes a comparison of the calculated security score (operation 504) and the security score threshold associated with the one or more actions included in the second authentication request.

In some embodiments, authorization of the one or more actions based on a successful outcome of a verification operation may be passive (e.g., with no notification provided to the individual besides execution of the one or more actions). Alternatively, the apparatus 200 (e.g., communications hardware 206) may transmit a message or indicator (e.g., a green checkmark, or the like) to a computing device associated with the individual (e.g., user device 106A through user device 106N) that indicates a successful execution of one or more actions and a transition from a previous authenticated session to another authenticated session. In some embodiments, the indicator may remain present on a user device 106A as long as the authenticated session is active.

In some embodiments, after the second authentication request is authorized and the one or more actions associated with the second authentication request are executed, an individual may again request to execute one or more actions. In some embodiments, the one or more actions may be automatically authorized if the security score threshold of the one or more actions is below the security score for the authenticated session. In some embodiments, the one or more actions may require a security score that exceeds the security score associated with the authenticated session associated with the second authentication request. In such an instance, the apparatus 200 may re-execute operations 502-506 to generate a new authenticated session with a new plurality of authentication factors that may yield a higher security score. In addition, the apparatus 200 may search for a computing device not associated with the individual (e.g., substitute device 108A, or the like) to gather additional authentication factors (e.g., operations 402-406, FIG. 4).

FIGS. 3, 4, and 5 illustrate operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be implemented by execution of software instructions. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a non-transitory computer-readable memory that may direct a computing device or other programmable apparatus to function in a particular manner, such that the software instructions stored in the computer-readable memory comprise an article of manufacture, the execution of which implements the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

Conclusion

As described above, example embodiments provide methods and apparatuses that enable improved ability to use multifactor authentication to authenticate individuals by leveraging capabilities of a 6G cellular network to simultaneously receive and authenticate multiple authentication factors. Example embodiments thus provide tools that overcome the problems faced by conventional implementations of multifactor authentication that involve sequentially verifying each authentication factor about an individual. By avoiding the need to sequentially verify each authentication factor, example embodiments thus save time and reduce the risk of bad actors accessing the authentication factors about an individual. Moreover, embodiments described herein avoid the problems faced by traditional single factor authentication techniques, such as conventional passwords, one-time passwords, or the like. Finally, by enabling passive simultaneous multifactor authentication, the speed and consistency of the verification operations performed by example embodiments unlocks many potential new functions that have historically not been available, such as the ability to conduct near-real-time authentication of an individual using a plurality of authentication factors, thereby greatly enhancing the accuracy of the authentication process as a whole.

As these examples all illustrate, example embodiments contemplated herein provide technical solutions that solve real-world problems faced during existing implementations of multifactor authentication. And while bad actors gaining access to authentication factors has been an issue for decades, the recently exploding amount of malware available today has made this problem significantly more acute, as more entities transition to multifactor authentication even while the complexity of verifying multiple authentication factors has itself increased. At the same time, the recently arising ubiquity and capabilities of cellular networks (e.g., 6G) has unlocked new avenues to solving this problem that historically were not available, and example embodiments described herein thus represent a technical solution to these real-world problems.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A method for simultaneous multifactor authentication, the method comprising:
   in response to a first authentication request associated with one or more actions, receiving, by communications hardware of a server device, a plurality of authentication factors associated with a first individual, the plurality of authentication factors having been simultaneously transmitted from a user device associated with the first individual via a plurality of channels of a communications network;
   determining, by an authentication engine of the server device and using the plurality of authentication factors, a security score indicative of an authenticity of the plurality of authentication factors;
   determining, by the authentication engine of the server device and based on the security score, a successful verification outcome, wherein determining the successful verification outcome comprises:
      receiving, by the communications hardware of the server device and from computing devices within a predefined proximity to the user device, a plurality of authentication factor sets, wherein each authentication factor set of the plurality of authentication factor sets is associated with a respective individual different than the first individual,
      determining, by the authentication engine of the server device, that a predefined percentage of the plurality of authentication factor sets are incomplete,
      determining, by the authentication engine of the server device and based on the predefined percentage, an occurrence of an exogenous context impacting authentication factor reception,
      modifying, by the authentication engine of the server device and based on the exogenous context, a security score threshold associated with the one or more actions, and
      determining, by the authentication engine of the server device, that the security score satisfies the modified security score threshold; and
   authorizing, by the authentication engine of the server device, the one or more actions based on the successful verification outcome.

2. The method of claim 1, further comprising:
   receiving, by the communications hardware of the server device, a plurality of signature authentication factors associated with the first individual; and
   storing, by the communications hardware of the server device, the plurality of signature authentication factors in association with the first individual,
   wherein the security score is determined based at least on a subset of the plurality of signature authentication factors.

3. The method of claim 2, wherein determining the security score comprises:
   determining, by the authentication engine of the server device, a partial security score for a particular authentication factor of the plurality of authentication factors based on a comparison of the particular authentication factor and a corresponding signature authentication factor of the plurality of signature authentication factors, wherein the security score is based on the partial security score for each authentication factor of the plurality of authentication factors.

4. The method of claim 3, further comprising:
   simultaneously receiving, by the communications hardware of the server device and in response to a second authentication request, a second plurality of authentication factors associated with the first individual via the plurality of channels;
   performing, by the authentication engine of the server device, a second verification operation that evaluates the second plurality of authentication factors in parallel; and
   authorizing, by the authentication engine of the server device, one or more actions based on a successful outcome of the second verification operation.

5. The method of claim 4, wherein the one or more actions associated with the second authentication request require verification of more authentication factors than required for the first authentication request.

6. The method of claim 1, wherein the security score is determined using a security scoring model.

7. The method of claim 1, wherein the plurality of authentication factors are received via the plurality of channels from one or more devices in proximity to the first individual.

8. The method of claim 1, further comprising, in response to an unsuccessful outcome of a verification operation:
identifying, by the communications hardware of the server device, a substitute device in proximity to the first individual;
causing transmission, by the communications hardware of the server device, of an instruction to the substitute device to retrieve at least one additional authentication factor of the plurality of authentication factors associated with the first individual; and
receiving, by the communications hardware, the at least one additional authentication factor from the substitute device.

9. The method of claim 8, further comprising:
performing, by the authentication engine, a verification operation using the at least one additional authentication factor associated with the first individual; and
authorizing, by the authentication engine, the one or more actions based on a successful verification operation of the at least one additional authentication factor.

10. The method of claim 1, wherein the communications network comprises a cellular network, and wherein the plurality of channels are channels of the cellular network.

11. The method of claim 10, wherein the cellular network is a 6G network.

12. The method of claim 1, further comprising:
receiving, from the user device and by the communications hardware of the server device, a user-defined exogenous context message,
wherein determining the occurrence of the exogenous context is based further on the user-defined exogenous context message.

13. An apparatus for simultaneous multifactor authentication, the apparatus comprising:
communications hardware configured to receive, in response to a first authentication request associated with one or more actions, a plurality of authentication factors associated with a first individual, the plurality of authentication factors having been simultaneously transmitted from a user device associated with the first individual via a plurality of channels of a communications network; and
an authentication engine configured to:
generate, using the plurality of authentication factors, a security score indicative of an authenticity of the plurality of authentication factors,
determine, based on the security score, a successful verification outcome, wherein to determine the successful verification outcome:
the communications hardware is further configured to receive, from computing devices within a predefined proximity to the user device, a plurality of authentication factor sets, wherein each authentication factor set of the plurality of authentication factor sets is associated with a respective individual different than the first individual, and
the authentication engine is further configured to:
determine that a predefined percentage of the plurality of authentication factor sets are incomplete,
determine, based on the predefined percentage, an occurrence of an exogenous context impacting authentication factor reception,
modify, based on the exogenous context, a security score threshold associated with the one or more actions, and
determine, that the security score satisfies the modified security score threshold; and
authorize the one or more actions based on the successful verification outcome.

14. The apparatus of claim 13, wherein the communications hardware is further configured to:
receive a plurality of signature authentication factors associated with the first individual; and
store the plurality of signature authentication factors in association with the first individual, wherein the security score is determined based at least on a subset of the plurality of signature authentication factors.

15. The apparatus of claim 14, wherein the authentication engine is further configured to:
determine a partial security score for a particular authentication factor of the plurality of authentication factors based on a comparison of the particular authentication factor and a corresponding signature authentication factor of the plurality of signature authentication factors, wherein the security score is based on the partial security score for each authentication factor of the plurality of authentication factors.

16. The apparatus of claim 15 comprises:
communications hardware further configured to simultaneously receive in response to a second authentication request, a second plurality of authentication factors associated with the first individual via the plurality of channels; and
authentication engine further configured to:
perform a second verification operation that evaluates the second plurality of authentication factors in parallel; and
authorize one or more actions associated with the second authentication request based on a successful verification of the subset of the second plurality of authentication factors.

17. The apparatus of claim 13,
wherein the communications hardware is further configured to receive, from the user device, a user-defined exogenous context message, and
wherein the authentication engine is configured to determine the occurrence of the exogenous context based further on the user-defined exogenous context message.

18. A non-transitory computer-readable storage medium storing instructions that, when executed by an apparatus, cause the apparatus to:
receive, in response to a first authentication request associated with one or more actions, a plurality of authentication factors associated with a first individual, the plurality of authentication factors having been simultaneously transmitted from a user device associated with the first individual via a plurality of channels of a communications network;
determine, using the plurality of authentication factors, a security score indicative of an authenticity of the plurality of authentication factors; and
determine, based on the security score, a successful verification outcome, wherein determining the successful verification outcome comprises:
receiving, from computing devices within a predefined proximity to the user device, a plurality of authentication factor sets, wherein each authentication factor set of the plurality of authentication factor sets is associated with a respective individual different than the first individual, determining that a predefined percentage of the plurality of authentication factor sets are incomplete, determining, based on the predefined percentage, an occurrence of an exogenous context impacting authentication factor reception, modifying, based on the exogenous context, a security score threshold associated with the one or more actions, and determining that the security score satisfies the modified security score threshold; and authorize the one or more actions based on the successful verification outcome.

19. The non-transitory computer-readable storage medium of claim 18, wherein the instructions, when executed by the apparatus, further cause the apparatus to:

receive a plurality of signature authentication factors associated with the first individual; and store the plurality of signature authentication factors in association with the first individual, wherein the security score is determined based at least on a subset of the plurality of signature authentication factors.

20. The non-transitory computer-readable storage medium of claim 19, wherein the instructions, when executed by the apparatus, further cause the apparatus to:

determine a partial security score for an authentication factor based on a comparison of the authentication factor of the plurality of authentication factors and a corresponding signature authentication factor of the plurality of signature authentication factors, wherein the security score is based on the partial security score for each authentication factor of the plurality of authentication factors.

\* \* \* \* \*